UNITED STATES PATENT OFFICE.

ARTHUR LÜTTRINGHAUS AND LOUIS BLANGEY, OF MANNHEIM, GERMANY, ASSIGNORS, BY MESNE ASSIGNMENTS, TO BADISCHE ANILIN & SODA-FABRIK, OF LUDWIGSHAFEN-ON-THE-RHINE, BAVARIA, GERMANY, A CORPORATION OF THE GRAND DUCHY OF BADEN.

MANUFACTURE OF SOLUBLE CONDENSATION PRODUCTS.

1,412,949.     Specification of Letters Patent.     Patented Apr. 18, 1922.

No Drawing.     Application filed November 8, 1920. Serial No. 422,725.

*To all whom it may concern:*

Be it known that we, ARTHUR LÜTTRINGHAUS and LOUIS BLANGEY, citizens of Germany and the Swiss Republic, respectively, residing at Mannheim, Germany, have invented new and useful Improvements in the Manufacture of Soluble Condensation Products, of which the following is a specification.

This invention relates to the manufacture of water-soluble condensation products. As we have found, such products can be obtained by condensing an at least bicyclic organic compound, or derivatives of such including sulfonic acids, but excluding their hydroxy derivatives with a carbohydrate, such as cellulose, starch and their conversion products down to glucose, or with other sugars. Condensation takes place in the presence, or by the aid, of a sulfonating agent, but in the case of the sulfonic acids, such agent need not cause further sulfonation of the aromatic sulfonic acid employed. Condensation goes on at ordinary temperature, in most cases, and after removing mineral acids, if still present, or neutralizing them, a solution of valuable properties is obtained. For example, solutions of basic dyestuffs are thereby precipitated, in particular when suitable metal salts are present, and they are also very adapted for tanning purposes.

In order to further illustrate the process, the following examples are given to which however the invention is not limited. The parts are by weight.

100 parts of cellulose are introduced, whilst cooling and stirring, into 1500 parts of ordinary concentrated sulfuric acid of 65 or 66 degrees Baumé. As soon as all is dissolved and the solution remains clear on being diluted with water, 192 parts of finely powdered naphthalene are added, while avoiding too high a rise of temperature, and stirring is continued until all of the naphthalene is dissolved and naphthalene sulfonic acid can no longer be found. Then pour into water, neutralize by means of milk of lime, seperate from the gypsum, and decompose the calcium salt dissolved by means of sodium carbonate in the usual way. On evaporating the filtrate, the sodium salt of the condensation product remains as a brownish mass that is readily soluble in water. The solution precipitates glue from its acidulated solution and basic dyestuffs, in particular when salts of certain metals, such as aluminium sulfate, are present, to form finely divided precipitates very suitable for the manufacture of color lakes. The solid sodium salt prepared as described dissolves in concentrated sulfuric acid giving a brownish red or violet red coloration, and on heating in a dry condition it gives off sulfur dioxid and naphthalene vapors.

In the above example, naphthalene may be replaced by other organic compounds, at least bicyclic and free from hydroxyl groups, such for instance as methyl-naphthalene, chlor-naphthalene, naphthalene-sulfonic acids, anthracene, phenanthrene, carbazol and the like. Starch, dextrin, sugars may be used instead of cellulose.

We claim:

1. The process of manufacturing water-soluble condensation products which consists in condensing an at least bicyclic organic compound free from hydroxyl groups with a carbohydrate in the presence of a sulfonating agent.

2. The process of manufacturing water-soluble condensation products which consists in condensing napthalene, carbohydrate and sulfuric acid.

3. The process of manufacturing water-soluble condensation products which consists in combining naphthalene with a carbohydrate dissolved in sulfuric acid.

4. As a new article of manufacture, a condensation product resulting from the reaction between a bicyclic aromatic compound free from hydroxyl groups and a carbohydrate in the presence of a sulfonating agent, said product possessing at least one sulfonic acid group and being easily soluble in water and precipitating glue from its acid solutions.

5. As a new article of manufacture, a water-soluble condensation product resulting from the reaction between naphthalene, a carbohydrate and sulfuric acid, the sodium salt of which dissolves in sulfuric acid, giving a brownish or violet red coloration and on heating in a dry state gives off naphthalene and precipitates glue from its acidulated solutions.

In testimony whereof we have hereunto set our hands.

ARTHUR LÜTTRINGHAUS.
LOUIS BLANGEY.